United States Patent [19]
Pinto

[11] Patent Number: 4,786,517
[45] Date of Patent: * Nov. 22, 1988

[54] HIGH VOLUME DOUGH PIECE PRODUCTION METHOD

[75] Inventor: Albert A. Pinto, White Plains, N.Y.

[73] Assignee: Nabisco Brands, Inc., Parsippany, N.J.

[*] Notice: The portion of the term of this patent subsequent to Aug. 11, 2004 has been disclaimed.

[21] Appl. No.: 47,876

[22] Filed: May 7, 1987

Related U.S. Application Data

[63] Continuation of Ser. No. 522,293, Aug. 11, 1983, Pat. No. 4,685,878.

[51] Int. Cl.$^4$ .............................................. A21D 6/00
[52] U.S. Cl. ...................... 426/503; 426/516
[58] Field of Search ...................... 426/503, 516, 518; 425/202, 208, 306, 308, 311, 377; 83/110; 141/256; 198/460; 222/413

[56] References Cited

U.S. PATENT DOCUMENTS

| | | | |
|---|---|---|---|
| 1,319,190 | 10/1919 | Van Houten | 198/461 |
| 1,570,031 | 1/1926 | Baldner | 222/271 |
| 2,343,707 | 3/1944 | Roland | 222/317 |
| 2,377,668 | 1/1945 | Bole et al. | 425/377 |
| 2,573,566 | 10/1951 | Hammann | 222/413 |
| 2,634,691 | 4/1953 | Flockhart | 425/308 |
| 2,694,256 | 11/1954 | Coon, Sr. et al. | 222/271 |
| 2,838,013 | 6/1958 | Weidenmiller | 425/311 |
| 3,040,939 | 6/1962 | McCollough | 222/413 |
| 3,101,761 | 8/1963 | Buehler et al. | 425/308 |
| 3,115,276 | 12/1963 | Johanningmeier | 222/413 |
| 3,155,288 | 11/1964 | Landgraf | 222/413 |
| 3,347,177 | 10/1967 | Mendoza | 425/108 |
| 3,369,578 | 2/1968 | Lampert | 141/256 |
| 3,373,903 | 3/1968 | Hardman et al. | 222/142 |
| 3,466,839 | 9/1969 | Temple | 53/55 |
| 3,469,541 | 9/1969 | Simoneau | 425/377 |
| 3,658,212 | 4/1972 | Ullberg | 222/413 |
| 3,737,328 | 6/1973 | Schumann | 426/516 |
| 3,851,089 | 11/1974 | Gugler | 426/503 |
| 3,918,862 | 11/1975 | Bellew | 425/307 |
| 4,085,563 | 4/1978 | Egee et al. | 53/493 |
| 4,322,202 | 3/1982 | Martinez | 425/208 |
| 4,332,538 | 1/1982 | Campbell | 425/140 |
| 4,369,683 | 1/1983 | Bieg et al. | 83/157 |
| 4,442,741 | 4/1984 | Whittingham et al. | 83/80 |
| 4,517,212 | 5/1985 | Campbell | 426/503 |
| 4,689,236 | 8/1987 | Pinto | 426/503 |

FOREIGN PATENT DOCUMENTS 2098534 5/1982 United Kingdom.

*Primary Examiner*—George Yeung
*Attorney, Agent, or Firm*—Richard Kornutik

[57] ABSTRACT

Dough pieces are produced in high volume by a plurality of dual extruders spaced across a conveyor and each having a pair of extrusion nozzles aligned in the direction of conveyor travel. A cut-off mechanism severs the dough extrusions to deposit dough pieces on the conveyor. The speed of the conveyor is related to the speed of the cut-off mechanism so that the dough pieces produced by each extruder form a single uniformly spaced line. The extruders are fed from a common supply through individual inlets and means are provided to balance the flow through the nozzles.

3 Claims, 4 Drawing Sheets

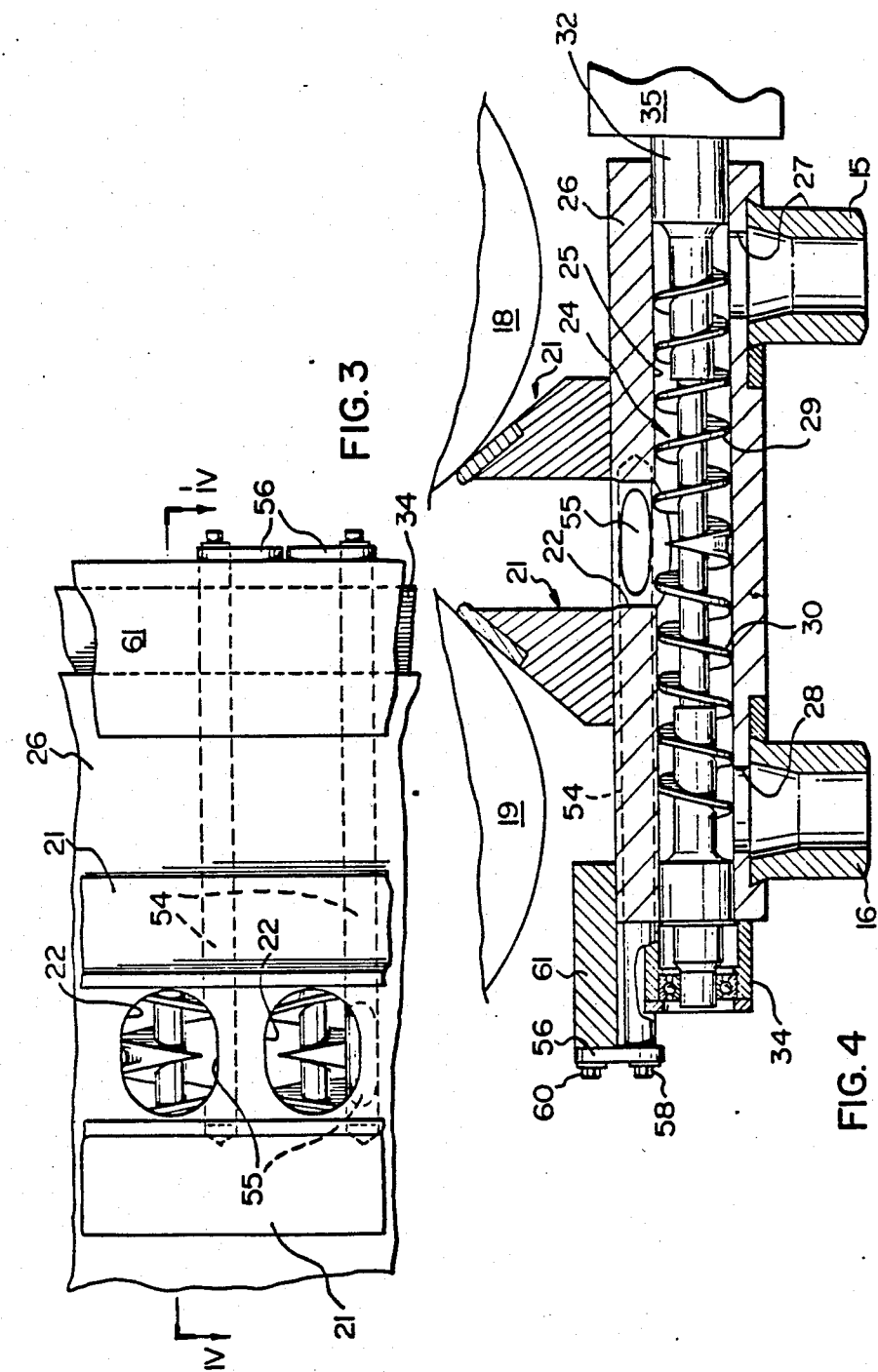

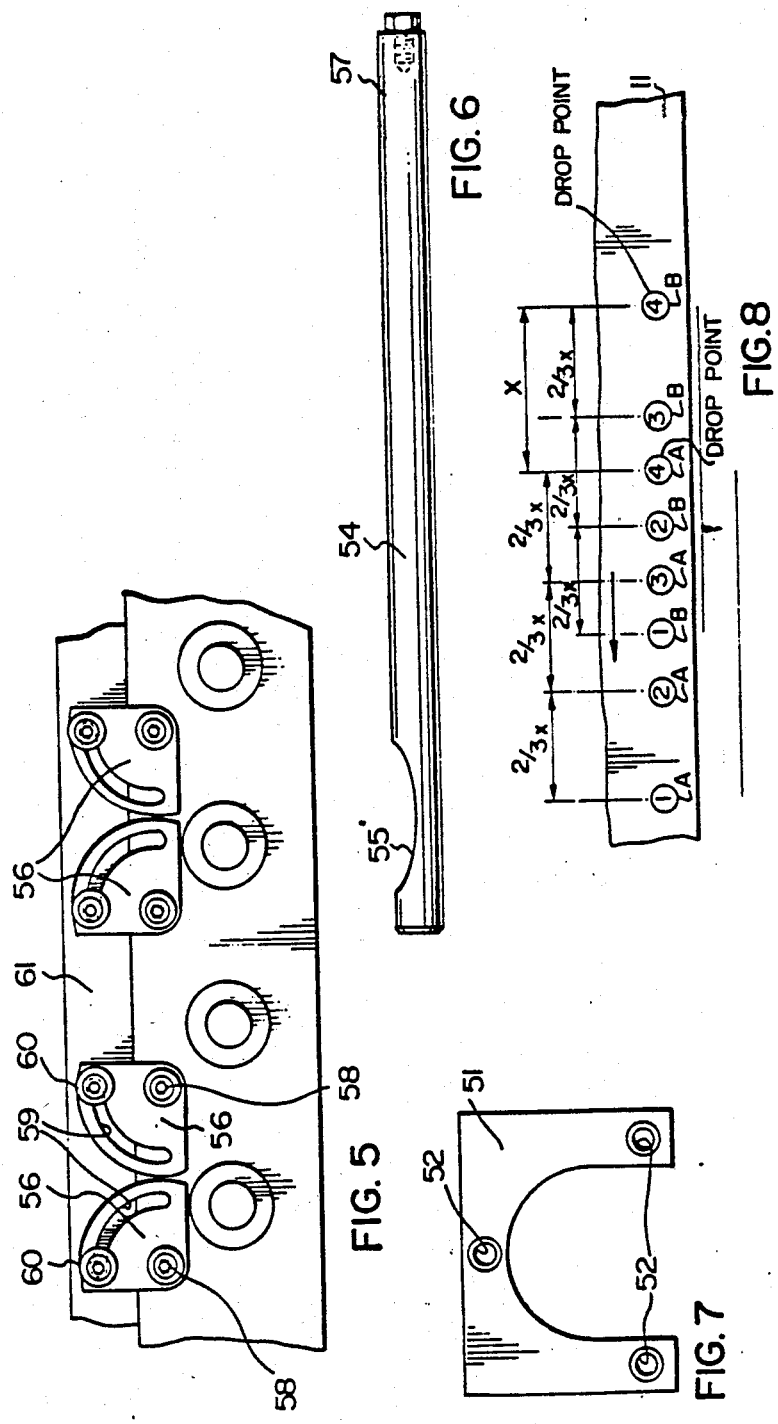

HIGH VOLUME DOUGH PIECE PRODUCTION METHOD

CROSS-REFERENCE TO RELATED APPLICATION

This application is a continuation of application Ser. No. 522,293, filed 8/11/83, now U.S. Pat. No. 4,685,878.

BACKGROUND OF THE INVENTION

The present invention relates to process for producing dough pieces, and more particularly, high volume apparatus for producing dough pieces cut from extruded dough.

In the baking industry there are continuous technological efforts to increase the rate of product flow through the dough forming, baking, and packaging operations of the manufacturing process.

The dough pieces for certain baked products are formed by the wire cut method. In this operation, dough is extruded from a horizontally oriented die and sections of the dough are sliced off by a thin moving wire.

The speed of the baking and packaging operations have advanced to the point where the commercially available wire cut machines cannot supply dough pieces at a rate sufficient to match those operations. While the extrusion rate can be increased considerably without difficulty, there is a practical limit to the speed at which the cutting wire will efficiently form dough pieces.

A wire cut machine deposits pieces onto a conveyor belt in a series of parallel rows or columns. The normal speed of operation of these machines is between 150 and 180 pieces per minute for each line deposited on the conveyor.

At these speeds, the wire cuts cleanly through the extruding dough without transferring a significant amount of energy to the piece cut off. The pieces fall vertically onto the conveyor in a consistent uniform pattern. When these machines run at speeds greater than 180 pieces per minute, the pattern is disrupted in two ways. At these high speeds the machine begins to vibrate and this effects the placement of the dough pieces. Also, the wire, because of its speed, transfers sufficient energy into the pieces to throw the pieces horizontally in an unpredictable manner. In addition, when the dough contains particles such as chocolate chips, the energy transferred to the pieces varies according to the number and location of the particles which are struck by the wire as it passes through the extrusion.

As a result of this unpredictable horizontal displacement of the dough pieces, the dough pieces are deposited on the conveyor in an irregular pattern which effects the baking and packaging operations. Modern efficient automated packaging machinery requires that the baked articles be arranged in well defined rows. Also, wire cut dough pieces generally spread during baking. Therefore, dough pieces which are too close together fuse into one large irregular baked piece and must be discarded. Modern packaging methods also require that the dough pieces be uniform in size so as to produce baked products of uniform size and weight which can be processed by automatic machinery.

SUMMARY OF THE INVENTION

It is therefore an object of the present invention to provide apparatus for producing dough pieces in high volume.

Another object is to provide such apparatus for producing wire cut dough pieces arranged in well defined rows.

Another object is to provide extrusion apparatus containing simple and effective means for balancing the flow of dough from a plurality of nozzles fed by a common source.

The foregoing objects are accomplished by providing a conveyor and a dough piece former having plural outlets spaced along the direction of travel of the conveyor, the speed of the conveyor being related to the operating speed of the dough piece former so as to form a line of evenly spaced dough pieces; and by providing throttling apparatus for balancing the flow of dough from a common source to individual nozzles.

BRIEF DESCRIPTION OF THE DRAWINGS

A preferred embodiment of the invention have been chosen for purpose of illustration and description and is shown in the accompanying drawings, forming apart of the specification, wherein:

FIG. 3 is an enlarged view of a portion of FIG. 2 showing flow adjusting mechanisms, FIG. 4 is a sectional view taken along line 4—4 on FIG. 3, FIG. 5 is an end view of the arrangement shown on FIG. 3, FIG. 6 is a side view of a flow adjusting rod, FIG. 7 is a front view of an auger positioning spacer, and FIG. 8 is a plan view of a portion of the conveyor illustrating the drop sequence of dough pieces in forming a row of dough pieces.

DESCRIPTION OF THE PREFERRED EMBODIMENT

Figure 1:
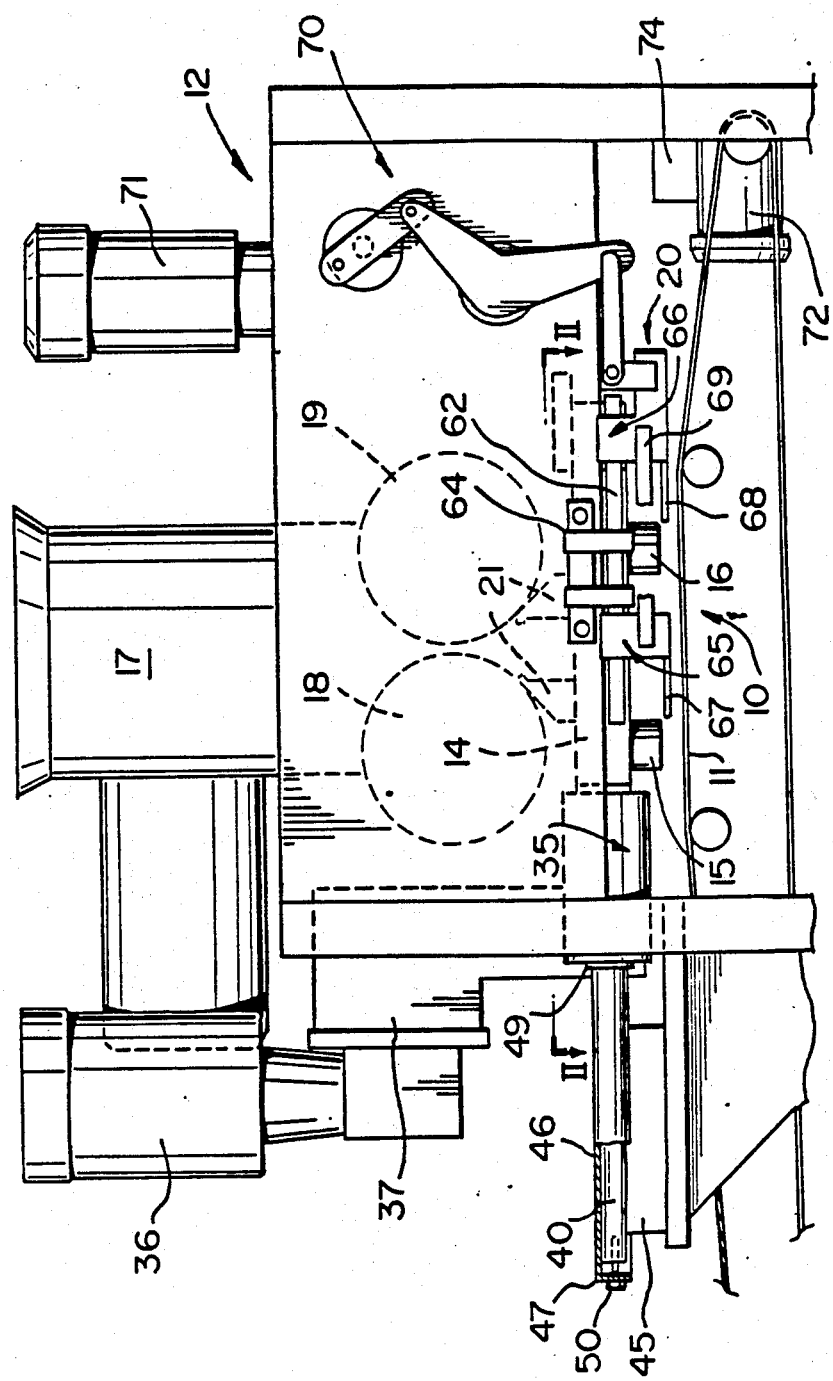
FIG. 1 is a side elevational view of a wire cut, dough piece forming apparatus according to the present invention.

Referring to the drawing in detail, there is shown apparatus according to the present invention which includes a conveyor 10 having a belt 11, are a wire cut dough machine 12 positioned over the conveyor. The machine 11 incorporates a series of dual extruders 14 spaced across the conveyor 10, each having two extrusion nozzles 15, 16. The extruders 14 are fed from a common hopper 17 by two feed rolls 18, 19. The hopper 17 and the rolls 18, 19 extend transversly of the conveyor across the extruders. A wire cut mechanism 20 simultaneously slices through the dough extruding from the nozzles 15, 16 to form dough pieces which fall upon the conveyor belt.

Referring now to FIG. 4, dough is forced by the rolls 18, 19 between a pair of scrapers 21 into the inlets 22 of the extruders. Each of the extruders 14 comprise a dual auger 24 fitted into a bore 25 in an auger housing 26. The nozzles 15, 16 are fastened to the bottom of the housing 26 inline with discharge openings 27, 28 at opposite ends of the dual auger.

The dual auger 24 comprises a right hand thread section 29 and a left hand thread section 30 which meet at the center beneath the inlet opening 22.

At the discharge ends of the augers, the minor diameter (the diameter of the central body) is increased to develop a greater dough pressure at the nozzles.

The shafts 32 on which the augers are formed are journalled at one end in a bearing block 34 and extend in the opposite direction through a block 35 which supports the drive motor 36 and gear train 37 which power the augers. The gear train includes a drive gear 39 mounted on the end of each shaft 32 and intermeshed with the adjacent gears 39. Since the gear train drives adjacent shafts in opposite directions, the augers formed on adjacent shafts are pitched oppositely. The shafts 32 are locked against axial movement with respect to the block 35 by suitable thrust bearings.

Figure 2:
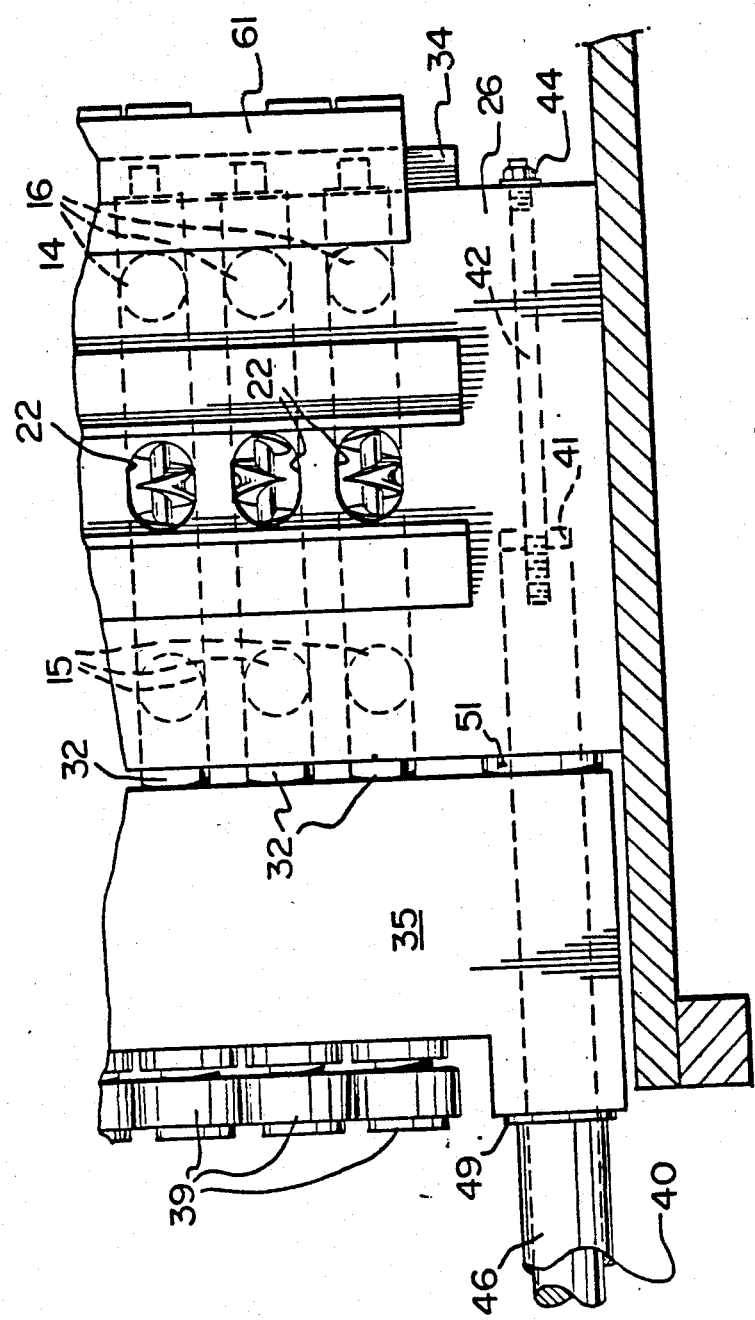
FIG. 2 is a plan view taken generally along line 2—2 on FIG. 1.

The support block 35 is mounted on a pair of shafts 40 which extend through the block 35 and into a bore 41 in the auger housing 26, as shown in FIG. 2. A rod 42, threaded at both ends, extends through the auger housing and is screwed into the end of the shaft 40 in the bore 41. A nut 44 is provided on the free end of the rod 42 to position the support block 35, and thereby the augers 24, relative to the auger housing 26. The position of the augers 24 with respect to the inlets 22 effects the relative rate of dough flow to the left hand and right hand portions of the auger.

The free end of each shaft 40 rests, for support, on the edge of a vertical plate 45, as shown in FIG. 1. A tube 46, provided with a slot in the bottom to admit the plate 45, surrounds the free end of each shaft 40. Each tube 46 is provided with a cap 47 on its free end and a flange 49 on the end adjacent the block 35. A bolt 50 extending through the cap 47 is threaded into the end of the shaft 40 to urge the sleeve to the right (as seen in FIG. 1) and position the flange 49 against the block 35.

Referring to FIG. 2, a space 51 is positioned between the block 35 and the auger housing 26. The spacers, shown in plan view in FIG. 7, are provided with counter-sunk bolt holes 52 and are bolted to the housing 26. The thickness of the spacer needed is determined by trial and error using thin shims where the spacer is. The machine 11 is placed in operation and the spacing between the block 35 and the housing 26 is adjusted by the adding and removing of shims until the flow rate from the nozzles 15 and the nozzles 16 are equal. Spacers of the required thickness are then substituted for the shims.

In a conventional bakery setup, the wire cut dough machine could contain 18 or more augers spaced across the conveyor belt. The augers and bores are formed by machining, and, even with strict tolerances some variations from part to part are unavoidable. Also, the flow rate from the hopper to the inlet openings tend to decrease at the ends of the hopper where friction with the end walls of the hopper produces a degree of laminar flow. The effects of these factors would result in variations in the size of the dough pieces in some rows with respect to that in others. Therefore, individually adjustable throttling mechanisms are provided at each inlet 22 to balance the output of the extruders 14.

As shown in FIGS. 3 and 4, a choke rod 54 extends through the auger housing 26 to intersect the edge of each opening 22. The rods 54 are cut out to provide a curved surface 55 which matches the contour of the edge of the inlet 22. When the surface 55 is vertically oriented, the inlet is unrestricted allowing full flow into the dual extruder. As the rod 54 is rotated through 90 degrees, the restriction provided by the rod increases to a maximum. Each rod 54 is rotationally positioned by means of an adjustment plate 56. A square formation 57 is provided on the free end of the rod. The plate 56 has a matching square hole (not shown). The plate is mounted on the formation 57 and held by a bolt 58.

Referring also to FIG. 5, the shape of the adjustment plate 56 approximates a circular quadrant. A curved slot 59 is formed in the plate along a 90 degree circular arc having its center at the axis of the rod 54. Each adjustment plate 56 is locked in position by a bolt 60 which extends through the curved slot, into the edge of a block 61 mounted on the auger housing 26.

The wire cut mechanism 20 includes a guide rod 62 mounted on each end of the machine 12 by a bracket 64. Sliding blocks 65 and 66 are mounted on each of the rods 62 on either side of the support bracket 64. Wire holding fingers 67, 68 are mounted on pivoted rods (not shown) which extend between the blocks 65, 66. Wires are stretched across the conveyor belt 11 between the free ends of the fingers 67 and between the free ends of the fingers 68. The sliding blocks 65 and 66 on each side of the machine are interconnected by bars 69 for synchronous motion. The sliding blocks are reciprocated upon the guide rods by a crank mechanism 70 driven by a motor 71. The reciprocating motion of the blocks 65, 66 more the cutting wires past the nozzles. Another crank mechanism (not shown) also driven by the motor 71 pivots the wire holding fingers 67, 68 upwardly toward the nozzles at the beginning of the cut stroke so that the wires move across the faces of the nozzles as the extrusion is sliced. On the retract stoke, the wire holding fingers are pivoted downwardly so that the wires pass below the end of the extruding dough streams.

The conveyor 10 is driven by a motor 72 provided with a speed control unit 74. The speed of the conveyor is adjusted with relation to the speed of operation of the cut-off mechanism 20, so that, between dough piece drops, the conveyor belt 11 moves a distance equal to two thirds of the spacing of the nozzles 15 and 16. Referring to FIG. 8, there is shown the drop pattern for one set of nozzles 15, 16. The nozzles are positioned above the circles marked "Drop Point" and are separated by a distance X as indicated. The circles on the conveyor belt 11 represent the dough pieces formed on four consecutive drops. The position of these dough pieces is that which they occupy at the time the fourth drop is made. The dough pieces marked "1" were dropped on the first drop and have moved through a distance of three times $\frac{2}{3}X$. The dough pieces marked "2" were dropped on the second drop and have moved through a distance of two times $\frac{2}{3}X$. The dough pieces marked "3" were dropped on third drop and have moved the distance $\frac{2}{3}X$.

Of these pieces, the "A" pieces were dropped from a nozzle 15 and the "B" pieces were dropped from a nozzle 16. The "A" pieces are separated from each other by a distance of $\frac{2}{3}X$. The "B" pieces are likewise separated from each other by a distance of $\frac{2}{3}X$, and each "B" piece falls halfway between two consecutive "A" pieces. Thus a line of dough pieces are formed in which the consecutive pieces are separated by one third the distance between the nozzles.

It will be seen from the foregoing that the present invention provides apparatus for producing dough pieces in high volume which are arranged in well defined rows and are of uniform size and weight.

I claim:

1. A method for producing dough pieces, comprising the steps of:

feeding dough to a pair of extruder nozzles at respective extrusion stations spaced a predetermined distance from one another above a conveyor;

extruding dough at substantially the same rate through said extruder nozzles;

cutting off sections of dough being extruded through said nozzles to form at each nozzle a series of discrete dough pieces, dough pieces being cut off substantially simultaneously at said nozzles;

depositing said dough pieces on said conveyor so that dough pieces formed at either one of said nozzles are spaced from each other on said conveyor by a distance equal to two-thirds of said predetermined distance; and continuously driving said conveyor at a speed so related to said predetermined distance and to the rate of dough piece formation that a line of equally spaced dough pieces is formed on said conveyor.

2. The method defined in claim 1 wherein said step of feeding comprises the step of simultaneously turning a pair of augers in respective screw extruders communicating with a respective dough inlet.

3. The method defined in claim 2 wherein said augers are connected to one another, further comprising the step of axially positioning said augers with respect to said inlet to balance the relative outputs of said screw extruders.

* * * * *